March 14, 1950  W. O'CONNOR  2,500,373
ANTISKID TIRE CHAIN AND DEVICE FOR ATTACHING SAME
Filed Jan. 11, 1947
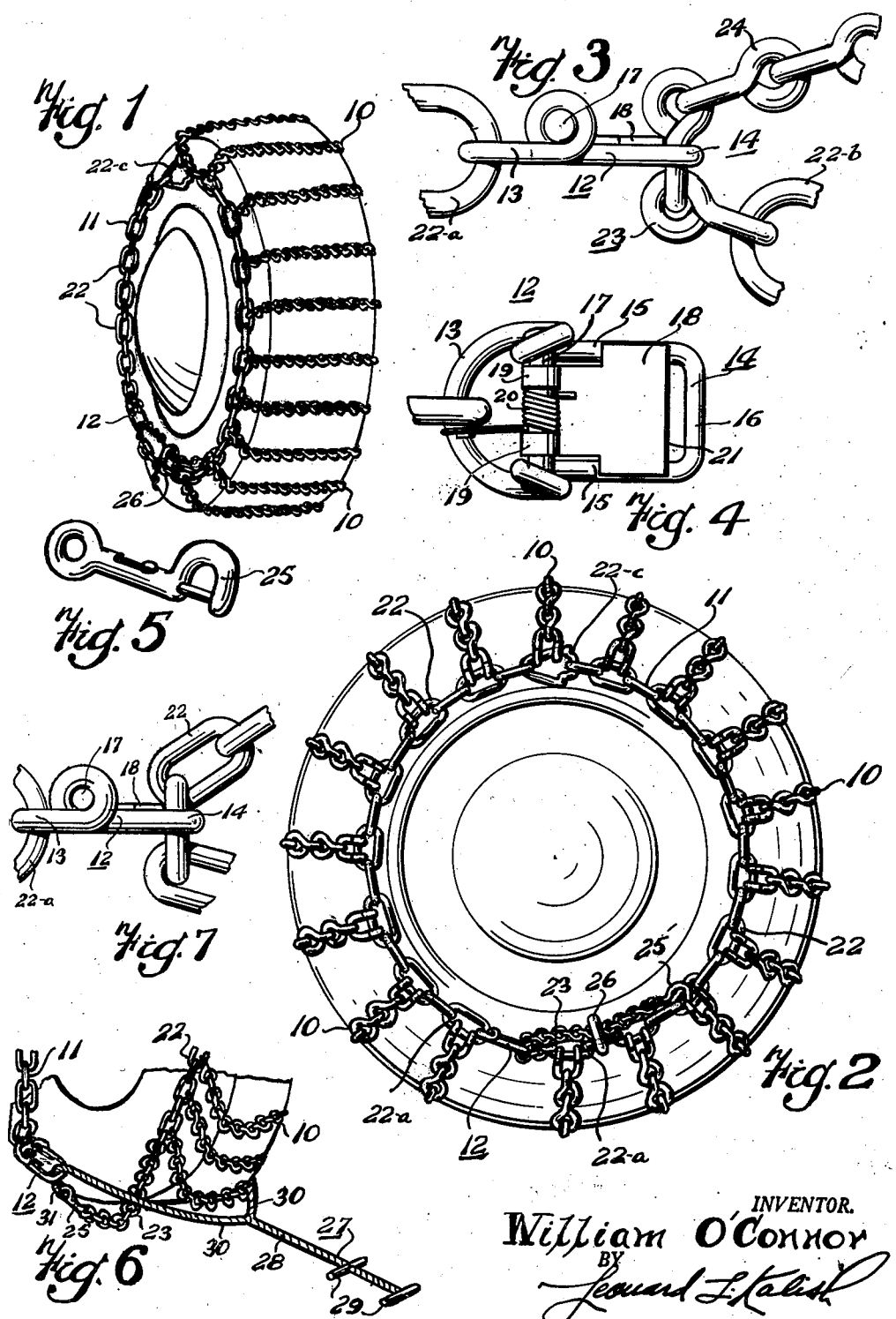
INVENTOR.
William O'Connor
BY
Leonard L. Kalish
Attorney Patented Mar. 14, 1950

2,500,373

UNITED STATES PATENT OFFICE 2,500,373

ANTISKID TIRE CHAIN AND DEVICE FOR ATTACHING SAME

William O'Connor, Philadelphia, Pa.

Application January 11, 1947, Serial No. 721,545

7 Claims. (Cl. 152—241)

The present invention relates to anti-skid chains for automobile wheels and it relates more particularly to anti-skid chains which can be attached and detached to the wheels of an automobile without the necessity of jacking or hoisting the car or the wheels off the ground.

An object of the present invention is to provide a new and improved construction for anti-skid chains or the like. Another object of the present invention is to provide an anti-skid chain construction for automobile wheels which can be quickly and easily attached and detached and which provides a firm, positive and dependable locking action when in use. Still another object of the present invention is to provide an easily-installed anti-skid chain which, optionally, can be fastened to an automobile wheel without the need for special equipment, and which is provided with positive and long-lasting locking mechanism.

Other objects and advantages of the present invention are apparent in the following detailed description, appended claims and accompanying drawings.

While many devices have been suggested in the past for permitting quick attachment and detachment of an automobile anti-skid chain without the need for jacking or hoisting the car or the wheel off the ground, these conventional devices, as heretofore employed, have not proven entirely satisfactory in that they have required complicated and impractical tools, or other similar attaching or detaching members, or they have been cumbersome or unwieldy or prone to failure of the fastening or locking mechanism during use.

Accordingly, the present invention contemplates a new and improved construction which, optionally, can be used wholly without auxiliary fastening tools (although a simple and easy-to-operate installing member may be used if desired) and which provides an auxiliary automatic adjustable locking action, effective during installation to hold the free ends of the chain (so as to permit ready adjustment and tightening of the chain upon the wheel) and which also provides a relatively stronger and more dependable locking mechanism adapted to carry the main load during operation.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a perspective view showing one embodiment of the present invention as it appears when fully installed upon an automobile wheel.

Figure 2 represents a side elevational view of the embodiment of Figure 1.

Figure 3 represents a fragmentary side elevational view, on an enlarged scale, of the auxiliary locking mechanism forming part of the present invention.

Figure 4 represents a top elevational view of the auxiliary locking mechanism of Figure 3.

Figure 5 represents a perspective view of the permanent locking mechanism forming part of the present invention.

Figure 6 represents a fragmentary perspective view showing the method of using the optional installing device in mounting the chain upon the automobile wheel.

Figure 7 represents a view generally similar to that of Figure 3 but showing a modified form of the present invention employing untwisted links 22 in place of the twisted links 24.

In one embodiment of the present invention shown generally in Figures 1–6, I may provide an anti-skid tire chain made up of a plurality of cross-chains 10 fastened at their ends, in generally conventional manner, to alternate links 22 of inner and outer side-chains 11; the side-chains 11 being adapted to form complete closed circles of smaller diameter than the tire, when completely assembled, as indicated in Figures 1 and 2.

Mounted at one end of each of the side-chains 11 is an automatic auxiliary locking member or buckle 12 which is shown particularly in Figures 3 and 4. The member 12 includes a rear loop 13 (which is permanently engaged with the last link 22—a of side-chain 11) and a front loop 14 having side-members 15 and a cross-member 16.

The locking member 12 is also provided with a transversely-extending pin or bolt 17 upon which a relatively thin flat locking tongue 18 is pivotally mounted; the tongue 18 being provided with a bifurcated rear end having spaced loop-portions 19 which encircle the pin 17 as indicated particularly in Figure 4.

A relatively strong coil spring 20 is mounted upon the pin 17 intermediate the loop-portions 19. One end of the spring 20 bears against the tongue 18 while the other end bears against the rear loop 13 so that the tongue 18 is tensioned downward against the front loop 14.

As indicated particularly in Figures 3 and 4, the end edge 21 of the tongue 18 terminates somewhat short of and generally parallel to the cross-member 16 of the front loop 14 so as to provide a slight clearance therebetween.

To the last link 22—b at the other end of each of the side-chains 11 is fastened one end of an end-chain 23 which is made up of links 24 which are twisted and which are smaller in size than the links 22 of the main side-chains 11. A harness-snap 25 of generally conventional construction is fastened to the other end of the end-chain 23.

As indicated particularly in Figure 2, the main side-chains 11 are so arranged that, when fully assembled on the wheel, the end links 22—a and 22—b do not quite meet; the end-chain 23 passing through the locking member or buckle 12 and being looped backward and passing through a ring 26 carried by one of the links 22, with the harness-snap 25 engaging one of the links 22, so as to lock the side-chains in closed position as shown in Figures 1 and 2.

The front loop 14 of the locking member 12 is large enough to permit the harness-snap 25 and the individual links 24 to be drawn therethrough in direction to tighten the side-chains 11; the tongue 18 being raised against the pressure of the spring 20 to permit passage of said harness-snap and said links.

As the individual twisted links 24 pass through the front loop 14 it is evident that the tongue 18 will be raised momentarily to permit passage of one of the eyes of the link and will then snap down, under the action of the spring 20; the clearance intermediate the front edge of the tongue 18 and the cross-member 16 being sufficient to accommodate that eye of each individual link 24 which extends in a plane parallel to the front edge 21 of the tongue 18.

It can thus be seen that, while the auxiliary locking member 12 permits ready passage of the end chain 23 therethrough in direction to tighten the side-chains 11, it will prevent return movement of the end-chain 23; the tongue 18 preventing return movement of the individual twisted links 24, while it remains in closed position against the front loop 14.

In installing the novel tire chain of the present invention upon an automobile wheel, the chain is first draped loosely over the top of the tire so that the end links 22—a and 22—b are at the bottom of the tire. The harness-snaps 25 and the chains 23 are then threaded through the loops 14 of the locking members 12 so as to tighten the side-chains 11 and to pull the end links 22—a and 22—b into proximity. It is evident that the locking members 12 serve to prevent return of the end-chains 23 so that there is no tension upon the free ends of the chains 23 which can then be readily passed through rings 26 and can be fastened, by means of the harness-snaps 25 to whichever link 22 will take up all of the slack.

If desired, the tongues 18 can then be raised manually so that there will be no tension upon the relatively weaker tongues; the pull of the chain 23, during operation of the automobile being borne by the cross-bar 16, the harness-snap 25 and the link 22 to which the snap is attached, all of these portions being appreciably stronger than the tongues 18 and being much less apt to fail during prolonged use.

In detaching the anti-skid chain of the present invention, the wheel is stopped with the end links 22—a and 22—b adjacent the bottom, and the end-chains 23 are again pulled tight manually so as to relock the members 12 and to provide slight additional slack for the free ends of the chains 23 to permit the harness-snaps 25 to be more readily disengaged from their links 22. After the harness-snaps 25 have been disengaged the tongues 18 can be raised manually and retained in open position to permit the end-chains 23 and the harness-snaps 25 to be drawn backward therethrough so as to disconnect the ends of the side-chains 11 and to permit the unit to be removed from the wheel.

From the foregoing, it is apparent that the anti-skid chain of the present invention can quickly and easily be attached to and detached from the wheel of an automobile, without raising the wheel off the ground. The end-chain 23 can be made of sufficient length to permit it readily to be threaded through the members 12 and to be grasped and pulled tight preliminary to locking of the harness-snaps 25.

However, if desired, an attaching rope member 27 can be employed to further simplify the attaching operation of the anti-skid chain.

The rope member 27 is generally Y-shaped and includes a main portion 28 which is equipped with pull-handles 29 near one end. To the other end of the main portion 28 are fastened a pair of side ropes 30 having metal rings 31 at their free ends.

In employing a rope member 27 for attaching the novel anti-skid chain of the present invention, the rings 31 are first threaded through the loops 14 of the locking members 12 and are then connected to the harness-snaps 25 as indicated in Fig. 6. The handles 29 are then grasped and the rope member 27 is pulled so as to draw the side ropes 30 back through the loops 14 and to carry the end-chains 23 with them; the locking members 12 automatically preventing the end-chains 23 from slipping backward. After the end-chains 23 have been pulled tight, the rings 31 are disconnected from the harness-snaps 25 which are then threaded through the rings 26 and are fastened to appropriate links 22 as described above.

As indicated particularly in Figure 2, one of the links of the outer side-chain 11, as for example the link 22—c which is generally diametrically opposite the links 22—a and 22—b, may be made in the form of an arrow-head or may be made otherwise distinguishable from the remaining links 22 to differentiate the inner and outer sides of the tire chain and also to distinguish between chains intended for the front and rear wheels respectively. Thus, for example, if the arrow-head 22—c is understood to be pointing toward the front of the car, the chain in Figure 2 would be recognized as to be applied to the left rear wheel of the car, so that the attaching rope member 27 could be operated from the rear of the car. On the other hand, if the arrow-head 22—c were reversed (so as to point toward the right in Figure 2) the tire chain would be recognized as intended for the right front wheel (so that the attaching rope member 27 could be operated from in front of the car).

While, for purposes of illustration, the links 22 are shown as being relatively large and being provided with the end-chain 23 (having smaller twisted links) it is obvious that, instead, the links 22 could be made smaller, or that the locking member 12 could be made larger, to permit the links 22 to pass through the locking member and to be engaged thereby.

Thus, as shown in Figure 7, a few additional links 22 could be attached to the link 22—b (with the harness-snap 25 at the other end) and could be passed through the locking member 12 so that the tongue 18 provides sufficient clearance for the link which lies in a plane paralleling its free edge 21 but prevents return movement of the next link which is more or less at right angles to the edge 21.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, I claim as new and desire to protect by Letters Patent:

1. In an anti-skid chain having side-chains and cross-chains connected between said side-chains; a locking buckle carried by one end of a side-chain, said buckle including a loop having a cross-bar and including a pivoted locking tongue normally spring-urged so that its side edges bear against said loop with the end edge of said tongue terminating somewhat short of and extending generally parallel to said cross-bar, an extension member composed of interconnected metal links and having successive portions disposed in angular relationship, said extension member being connected to the other end of the aforesaid side-chain, said extension member being able to pass through said loop by raising said tongue against the pressure of its spring, the clearance intermediate said cross-bar and the end edge of said tongue being large enough to accommodate those portions of the extension member lying in a plane generally paralleling said free edge but being too small to permit return movement of the successive portions lying in a different plane, and a connecting member carried by the free end of said extension member for detachably securing said free end to the aforesaid side-chain in doubled-over relationship to said cross-bar.

2. In an anti-skid chain having side-chains and cross-chains connected between said side-chains; a locking buckle carried by one end of a side chain, said buckle including a loop having a cross-bar and including a pivot-pin and including a locking tongue tiltably mounted on said pivot-pin and including a coil spring mounted on said pivot-pin and bearing against said locking tongue so as normally to hold said tongue so that its side-edges bear in contact with said loop with the end edge of said tongue terminating somewhat short of said cross-bar and extending generally parallel thereto, an extension member composed of interconnected metal links and having successive portions disposed in angular relationship, said extension member being connected to the other end of the aforesaid side-chain, said extension member being able to pass through said loop by raising said tongue against the pressure of its spring, the clearance intermediate said cross-bar and the end edge of said tongue being large enough to accommodate those portions of the extension member lying in a plane generally paralleling said free edge but being too small to permit return movement of the successive portions lying in a different plane, and a connecting member carried by the free end of said extension member for detachably securing said free end to the aforesaid side-chain in doubled-over relationship to said cross-bar.

3. In an anti-skid chain having side-chains and cross-chains connected between said side-chains; a locking buckle carried by one end of a side-chain, said buckle including a loop having a cross-bar and including a pivoted locking tongue normally spring-urged so that its side edges bear against said loop with the end edge of said tongue terminating somewhat short of and extending generally parallel to said cross-bar, an extension member composed of interconnected metal links, each twisted so as to provide portions disposed generally at right angles to each other, said extension member being connected to the other end of the aforesaid side-chain, said extension member being able to pass through said loop by raising said tongue against the pressure of its spring, the clearance intermediate said cross-bar and the end edge of said tongue being large enough to accommodate those link-portions lying in a plane generally paralleling said free edge but being too small to permit return movement of the oppositely-disposed link portions, and a harness-snap carried by the free end of said extension member for detachably securing said free end to the aforesaid side-chain in doubled-over relationship to said cross-bar.

4. In an anti-skid chain having side-chains and cross-chains connected between said side-chains; a locking buckle carried by one end of a side-chain, said buckle including a loop having a cross-bar and including a pivoted locking tongue normally spring-urged so that its side edges bear against said loop with the free edge of said tongue terminating somewhat short of and extending generally parallel to said cross-bar, an extension member composed of interconnected metal links and having successive portions disposed in angular relationship, said extension member being connected to the other end of the aforesaid side-chain, said extension member being able to pass through said loop by raising said tongue against the pressure of its spring, the clearance intermediate said cross-bar and the end edge of said tongue being large enough to accommodate those portions of the extension member lying in a plane generally paralleling said free edge but being too small to permit return movement of the successive portions lying in a different plane, a connecting member carried by the free end of said extension member for detachably securing said free end to the aforesaid side-chain in doubled-over relationship to said cross-bar, and a directional indicator carried by the aforesaid side-chain for distinguishing between anti-skid chains adapted for application to the front or rear wheels.

5. In an anti-skid chain having side-chains and cross-chains connected between said side-chains; a locking buckle carried by one end of each side-chain, said buckle including a loop having a cross-bar and including a pivoted locking tongue normally spring-urged so that its side edges bear against said loop with the end edge of said tongue terminating somewhat short of and extending generally parallel to said cross-bar, an extension member composed of interconnected metal links and having successive portions disposed in angular relationship, said extension member being connected to the other end of each of the aforesaid side-chains, said extension member being able to pass through said loop by raising said tongue against the pressure of its spring, the clearance intermediate said cross-bar and the end edge of said tongue being large enough to accommodate those portions of the extension member lying in a plane generally paralleling said free edge but being too small to permit return movement of the successive portions lying in a different plane, and a connecting member carried by the free end of each of said extension members for detachably securing said free end to the aforesaid side-chain in doubled-over relationship to said cross-bar.

6. For use with an anti-skid chain of the character described in claim 1; an attaching device including a pull-handle and an elongated flexible portion having a ring at its free end, said flexible portion being adapted to be passed through said loop and to have its ring connected to said fastening member whereby it will thread said extension member through said loop when said pull-handle is pulled.

7. For use with an anti-skid chain of the character described in claim 5; an attaching device including a pull-rope having a pair of flexible members connected to one end thereof, the free ends of said flexible members being provided with rings and being adapted to be passed through the loops of the locking buckles and being adapted to be engaged by the connecting members whereby the connecting members and the extension members are threaded through said loops when said pull-rope is pulled.

WILLIAM O'CONNOR.

REFERENCES CITED

The following references are of record in the file of this patent:

UNITED STATES PATENTS

| Number | Name | Date |
|---|---|---|
| 395,742 | Conkey | Jan. 8, 1889 |
| 1,409,025 | Rawlins | Mar. 7, 1922 |
| 1,573,631 | Cheape | Feb. 16, 1926 |
| 2,059,100 | Green | Oct. 27, 1936 |
| 2,222,891 | Ransom | Nov. 26, 1940 |